July 21, 1942.  J. A. TALALAY  2,290,510
APPARATUS FOR MOLDING SPONGE-LIKE ARTICLES
Filed June 6, 1940

INVENTOR
Josef Anton Talalay
BY Willard D. Eakin
ATTORNEY

Patented July 21, 1942

2,290,510

UNITED STATES PATENT OFFICE 2,290,510

APPARATUS FOR MOLDING SPONGELIKE ARTICLES

Josef Anton Talalay, Harpenden, Hertz, England

Application June 6, 1940, Serial No. 339,162
In Great Britain February 22, 1937

3 Claims. (Cl. 18—34)

This invention relates to apparatus for manufacturing articles comprising rubber or rubberlike material in cellular or sponged form. Some of the subject matter of this application is disclosed in my co-pending application Serial No. 140,737, filed May 4, 1937.

In the sponging of a dispersion or solution of such material in a mold and setting it therein, as by coagulation or vulcanization or both, in apparatus such as heretofore has been employed, entrapped air or gas between the sponging material and a wall of the vessel or mold may prevent the sponging material from completely filling out and thus result in cavities or blemishes in the surface of the product, and also shrinkage may occur such as to result in an imperfectly molded article.

Also, when the material is sponged in a plurality of vessels or molds in a single chamber at the same time, by the use of pressure reduction as in my United States Patent No. 2,140,062, or by any other procedure for the expansion or generation of gas in the material, problems have arisen in the fact that some of the vessels or molds may become filled with the sponged material and overflow before others have become completely filled.

The chief objects of this invention are to provide apparatus adapted to correct the above mentioned evils individually; to provide also for their concurrent correction by a single expedient; and to provide also, by the same expedient, a desirable surface texture for the product.

I attain these objects by providing for automatic closure of the vessel or mold against substantial further escape of sponged material at such time as the vessel or mold has become filled with the sponged material, the vessel or mold having, until then, a vent for escape of air or gas driven out by the expansion of the material.

The frothed material, filling the vessel or mold, can be fully coagulated and vulcanized therein or, if it has been frothed by means of a gas producing substance so that the gas pressure within the cells is substantially that of the atmosphere, the froth can be poured into other vessels or molds for the setting and the vulcanizing operation, and then expanded therein by heat or by reduction of external pressure. The apparatus can be employed for molding pre-vulcanized dispersions, such as vulcanized rubber latex.

Fillers, coloring matter and fibrous material may be provided in the product either by mixing them therein before the beginning of the frothing operation or, in the case of fibrous material, such as hair, by disposing it as desired in the mold and allowing the frothing material to progress though its interstices, suitable means being provided, if desired, for maintaining a predetermined location or distribution of the fibrous material in the mold.

Figure 1:
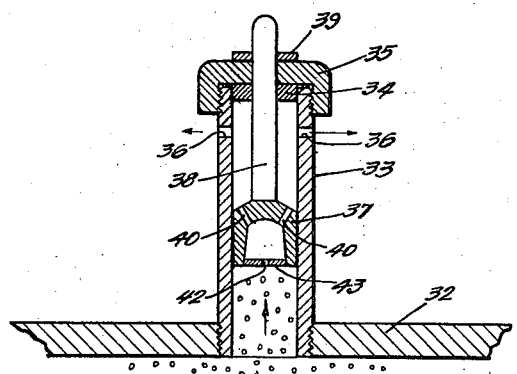
Fig. 1 is a vertical fragmentary section of apparatus embodying the invention.

In the embodiment of the invention shown in Fig. 1 the container 32 is provided with a neck member 33 closed at the top by a washer 34 and screw-cap 35 which are centrally apertured to accommodate with a sliding fit a guide-stem 38 of a preferably hollow float member 37. Above the cap 35 the stem 38 is provided with a stop collar 39 for supporting the float in its lowermost position in the neck member 33.

In order that air or gas may readily escape until the vessel and a part of the neck member have become filled with the sponged material the float member 37 is provided with apertures 40, 40 and the neck member near its top is provided with apertures 36, 36. To cause the float member to have greater buoyancy on the sponging material when the latter reaches it, the cavity of the float member may be partially closed at its lower end by a pressed-in sheet of porous material 43, with or without one or more apertures such as the aperture 42.

This construction is such that the sponging material rising in the neck member 33 will engage the float and raise it until its side-wall closes off the apertures 36 of the neck member, upon the slide-valve principle, and, if desired, the position of the projecting portion of the guide-stem 38 can be employed, visually or otherwise, to indicate or register the fact that the vessel has become filled with the cellular material.

Figure 2:
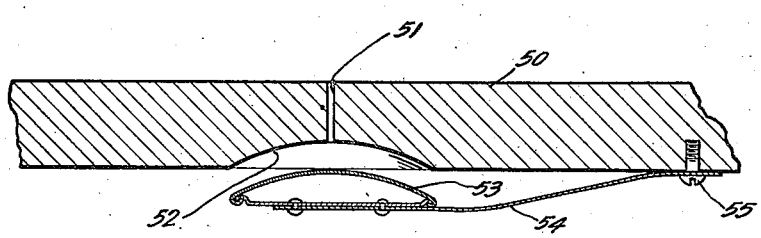
Fig. 2 is a vertical fragmentary section of an alternative type of apparatus embodying the invention.

In the apparatus shown in Fig. 2 the lid 50 of the vessel or mold in which the sponge rubber article is molded is provided with a vent aperture 51 extending from its upper or outer face to a recess 52 in its lower or inner face and a float member 53 adapted to fit in the recess 52 to close the vent aperture 51 is mounted upon the free end of a light, flat spring 54 the other end of which is secured to the lower face of the member 50 as by means of a screw 55. This construction is such that air and gases can escape from the vessel or mold through the vent aperture 51 as the expanding froth rises in the vessel but the float 53 will be raised by the rising froth and the reactive force of the spring 54 to close the vent aperture 51 when the rising froth has completely filled the vessel.

The closure effected by the method and apparatus of the invention need not be hermetic and can remain permeable to gases while impermeable to the froth during the period following the complete filling of the vessel and during the setting operation. This is very important in those cases where, partly through collapse of a certain amount of bubbles, partly through the continuation of the chemical reaction or of the physical change, even after the mold has been filled completely, more gas is liberated which, if not permitted to escape, would accumulate over the froth (which is still mobile) and would tend to compress the volume of the latter. Again, the possible non-hermetic nature of the closure has the advantage, when making spongy or cellular rubber products by a method employing reduction of pressure to subatmospheric, that after the setting is complete the normal pressure is restored, air or other gas can penetrate through the permeable closure, slowly filling the structure with air or gas.

I claim:

1. Apparatus for molding an article comprising cellular material by expansion of said material, said apparatus comprising a mold having a vent aperture for the escape of gas therefrom as the material expands in the mold, and means other than the said article and made effective by expansion of the cellular material for at least substantially closing the vent aperture against the escape of said material.

2. Apparatus for molding an article comprising cellular material by expansion of said material, said apparatus comprising a mold having a vent aperture for the escape of gas therefrom as the material expands in the mold, and means other than the said article and made effective by expansion of the cellular material for at least substantially closing the vent aperture automatically against the escape of said material when the expanding material reaches the vent aperture.

3. Apparatus for molding an article comprising cellular material by expansion of said material, said apparatus comprising a mold having a vent aperture for the escape of gas therefrom as the material expands in the mold, and float valve means other than the said article and made effective by expansion of the cellular material for at least substantially closing the vent aperture against the escape of said material.

JOSEF ANTON TALALAY.